United States Patent

Buehler et al.

[11] Patent Number: 5,146,292
[45] Date of Patent: Sep. 8, 1992

[54] METHOD FOR SELF-CORRECTION OF A FIBER GYROSCOPE WITH A 3×3-COUPLER

[75] Inventors: Wolfhardt Buehler, Munich; Hans Poisel, Dachau; Gert Trommer, Munich, all of Fed. Rep. of Germany

[73] Assignee: Messerschmitt-Boelkow-Blohm GmbH, Munich, Fed. Rep. of Germany

[21] Appl. No.: 535,768

[22] Filed: Jun. 8, 1990

Related U.S. Application Data

[63] Continuation-in-part of Ser. No. 508,294, Apr. 10, 1990.

[30] Foreign Application Priority Data

Jun. 10, 1989 [DE] Fed. Rep. of Germany ....... 3919060

[51] Int. Cl.$^5$ ............................................ G01C 19/72
[52] U.S. Cl. .................................................. 356/350
[58] Field of Search ...................................... 356/350

[56] References Cited

U.S. PATENT DOCUMENTS

| | | | |
|---|---|---|---|
| 4,440,498 | 4/1984 | Sheem | 356/350 |
| 4,479,715 | 10/1984 | Sheem | 356/350 |
| 4,653,917 | 3/1987 | Moeller et al. | 356/350 |

FOREIGN PATENT DOCUMENTS 3805904  8/1989  Fed. Rep. of Germany .

Primary Examiner—Samuel Turner
Assistant Examiner—LaCharles P. Keesee
Attorney, Agent, or Firm—W. G. Fasse

[57] ABSTRACT

The damping of the fiber coil of a fiber gyroscope is automatically corrected or newly determined in a microprocessor by repeating a calculation program in which a previously known damping factor of the fiber coil is replaced by a more recently determined damping factor. The calculation program is repeated until the calculated damping factor converges toward a fixed value. In this way, changes in the damping factor, e.g. due to aging of the fiber coil, due to splicings in the fiber coil, are ascertained and automatically corrected.

3 Claims, 1 Drawing Sheet

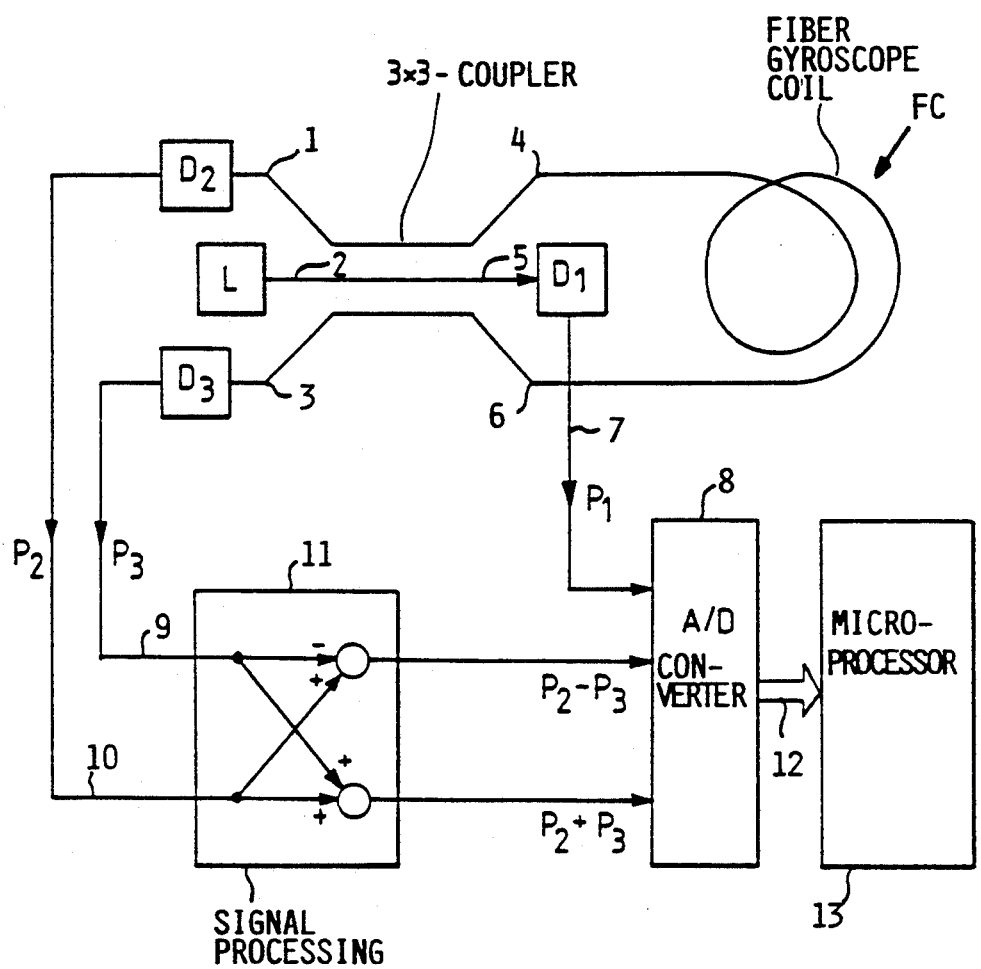

METHOD FOR SELF-CORRECTION OF A FIBER GYROSCOPE WITH A 3×3-COUPLER

CROSS-REFERENCE TO RELATED APPLICATION

The present application is a Continuation-In-Part Application of U.S. Ser. No.: 07/508,294, filed on Apr. 10, 1990, and entitled: METHOD FOR EVALUATING SIGNALS OF A FIBER OPTICAL GYROSCOPE OR SAGNAC INTERFEROMETER, by inventors Wolfhard Buehler Hans Poisel, and Gert Trommer.

FIELD OF THE INVENTION

The invention relates to a method for the self-correction of a fiber gyroscope with a 3×3-coupler for determining the Sagnac-phase, the contrast, and the intensity of the light source, by signal evaluation of the photo-currents of the photo-diodes in an evaluating computer or micro-controller arranged for cooper-ation with the fiber gyroscope.

BACKGROUND INFORMATION

U.S. Pat. No. 4,440,498 (Sheem) relates to an optical fiber gyroscope with a 3×3-couper, or rather directional coupler, which, with the aid of the 3×3-coupler, operates close to the quadrature point without the need for a modulator.

U.S. Pat. No. 4,479,715 (Sheem) discloses a fiber gyroscope in which the gyrorate is determined by forming the quotient of the signals of two photo-diodes. This type of signal evaluation has the advantage that the light intensity of the light source is cancelled out of the equation so that the fluctuations of the light source do not have any influence on the measured result. Additionally, the fluctuations in the damping of the fiber coil also cancel each other in the calculation. The same is true for any damping caused by the coil splices.

The above mentioned related application U.S. Ser. No. 07/508,294 discloses a method which permits determining a precise Sagnac-signal in spite of unknown fluctuations of the polarization characteristics of the fiber coil and of the coil splices.

U.S. Pat. No. 4,653,917 (Moeller et al.) discloses a fiber optical gyroscope operating with an unpolarized light source providing a broadband spacially coherent light beam supplied by a super-luminescent diode source. A reduction in base band noise is achieved due to the use of the essentially unpolarized light beam.

It is known that fiber gyroscopes having a 3×3-coupler, due to their structural features, basically do not permit an operation with a reciprocal light path. Environmental fluctuations, for example, temperature fluctuations, pressure fluctuations, and so forth, of the polarization transmission characteristics of the fiber coil become noticeable in the form of a zero point drift and in a scale factor drift of the gyro signal. The zero point errors can be avoided by using nonpolarized light. However, the scale factor changes which are caused by contrast variations of the interference signal, remain. In accordance with the teaching in the above mentioned parent application, it is possible to take into account the scale factor variations by evaluating the signals $P_1$, $P_2$, $P_3$ of the three detector diodes $D_1$, $D_2$, $D_3$ in such a manner that the three unknown values of the Sagnac-phase, the contrast, and the intensity of the light source follow in an unambiguous manner.

However, the following problem still exists. In the above mentioned method the three detector signals $P_1$, $P_2$, and $P_3$ are the prerequisite for the signal evaluation for which the respective equation is as follows when nonpolarized light is used:

$P_1 = v \cdot D \cdot I$ \hfill Equation (1)

$P_2 = v(A + kB \cdot \cos(\Phi - c))ds \cdot I$ \hfill Equation (2)

$P_3 = v(A + kB \cdot \cos(\Phi + c))ds \cdot I$ \hfill Equation (3)

In the foregoing equations v is a conversion factor for describing the efficiency of the photo-diodes, I is the intensity of the light source L; and A, B, c, and D are constant coefficients which result from the transmission characteristics of the 3×3-coupler. Further, k is the contrast factor of the interfering signal resulting from the polarization characteristics of the fiber coil, and ds is the damping factor which contains the damping of the fiber coil including any coil splices. Particularly, the damping ds must be known because this factor is explicitly required in the signal evaluation of the above mentioned method:

$$\frac{P_2 - P_3}{P_2 + P_3 - 2A/D\, ds \cdot P_1} \cdot \cot c = \tan \Phi \hspace{1em} \text{Equation (4)}$$

A determination of the Sagnac-phase and thus of the needed gyro rate thus requires that the damping factor ds is known. However, it is a requirement for these gyroscopes that their technical use or useful life must be within the range of ten to twenty years. In such time periods the damping of the fiber coil may change, due to increasing so-called micro-bending and splice losses which change with time. In the case of using such a fiber gyroscope after it has not been used or has been stored for several years, the damping coefficient ds will have changed in an unknown way. An exact determination of the gyro rate is thus not assured anymore.

OBJECTS OF THE INVENTION

In view of the foregoing it is the aim of the invention to achieve the following objects singly or in combination:

to avoid the above mentioned problems and to provide a method in which the damping factor ds can be exactly determined; and to calculate the damping factor repeatedly starting with the initially known damping factor, until the new damping factor approximates or converges to a constant or fixed value.

SUMMARY OF THE INVENTION

According to the invention the above objects have been achieved in a surprisingly simple manner in that first photo-current signals are stored in the memory of a microprocessor or controller when the gyro does not rotate. Then, photo-currents are stored in the memory of the microcontroller when the gyro does rotate. Then, a recurring scheme or program is repeatedly employed in order to calculate the new damping coefficient on the basis of the stored signal and starting out with the initially known damping factor. The procedure is repeated until the new damping factor converges to a constant value. In the repetition the damping factor calculated in the preceding repetition is used in the next repetition and so forth.

The invention is based on the recognition that the gyro rate is zero as long as the fiber gyroscope is at rest. Thus, the Sagnac-phase $\Phi$ is also zero and hence not unknown. Therefore, the damping coefficient ds can be considered to be the unknown, and then calculated. This procedure, however, can be applied to any random value of the Sagnac-phase $\Phi$ and not only for $\Phi=0$ because in the latter case the Equation (4), as set forth above, yields no well defined solution for ds, as both $\phi$ and $(P_2-P_3)$ become zero.

BRIEF DESCRIPTION OF THE DRAWING

The invention will now be described, by way of example, with reference to the single Fig. of the accompanying drawing showing a fiber gyroscope with a 3×3-coupler and an evaluation circuit as is also shown in the parent application mentioned above.

DETAILED DESCRIPTION OF PREFERRED EXAMPLE EMBODIMENTS AND OF THE BEST MODE OF THE INVENTION

A light source L feeds its light into the input terminal 2 of a 3×3-coupler. The fiber coil FC is connected with its fiber ends to the terminals 4 and 6 of the coupler. A first photodiode $D_1$ is connected to receive light from the terminal 5 of the 3×3-coupler. The electrical output signals $P_1$ of the first photo-diode $D_1$ are supplied through a conductor 7 to one input of an analog-to-digital converter 8. A second photo-diode $D_2$ is connected to the terminal 1 of the 3×3-coupler. A third photo-diode $D_3$ is connected to the terminal 3 of the 3×3-coupler. These further photo-diodes $D_2$ and $D_3$ produce second and third electrical signals $P_2$ and $P_3$, which are supplied through conductors 9 and 10 to respective inputs of a signal processing circuit 11 comprising summing networks to produce the sum $P_2+P_3$ and the difference $P_2-P_3$ of the two photo-diode signals $P_2$ and $P_3$. The outputs of the signal processing circuit 11 are connected to respective input terminals of the A/D converter 8. The analog input signals $P_1$, $P_2-P_3$, and $P_2+P_3$ are digitized in the analog-to-digital converter 8, which is connected with its output through a databus 12 to a microprocessor control circuit 13 which performs the repetitive operations as described below.

The invention solves the above stated problem by a self-calibrating procedure just prior to placing the fiber gyroscope FC in service after a prolonged storage time or nonuse time. For this purpose, the following operations are performed:

(a) while the gyroscope FC is in a rest position—e.g., in storage-without rotating, the signals or currents of the diodes $D_1$, $D_2$, $D_3$ are measured and the respective photocurrent $P_{1R}$, $P_{2R}$, $P_{3R}$ are stored in the memory of the microcontroller or processor 13.

(b) while the gyroscope rotates with any desired rotational rate, for example, while it is being transported to its place of use, the signals $D_1$, $D_2$, and $D_3$ are measured again, and the corresponding values $P_{1D}$, $P_{2D}$, and $P_{3D}$ are also stored in the computer memory;

(c) then, in a recurring scheme or program the new damping coefficient $ds_{new}$ is calculated based on the old damping coefficient $ds_{old}$—known from the initial calibration—and on the basis of the stored signal values, whereby the Sagnac-phase $\Phi$ is calculated as follows;

$$\frac{P_{2D} - P_{3D}}{P_{2D} + P_{3D} - 2A/D\, ds_{old} \cdot P_{1D}} \cdot \cot c = \tan \Phi \quad \text{Equation (5)}$$

the contrast factor K is calculated as follows:

$$k = \frac{P_{2D}/P_{1D} \cdot D/ds_{old} - \dot{A}}{B \cos(\Phi - c)} \quad \text{(Equation) (6)}$$

Finally, the new damping factor $ds_{new}$ is calculated as follows:

$$ds_{new} = P_{2R}/P_{1R} \cdot D/A + kB \cos c \quad \text{Equation (7)}$$

In this operation always the old damping coefficient is the one calculated in the just preceding operation and the calculations are repeated until the new damping coefficient converges to a fixed or constant value.

The substantial advantage of the present automatic or self-calibration is seen in that the quality of the fiber coil and of the splicing junctions, as well as the long duration stability do not have to satisfy the same high requirements that had to be satisfied heretofore. Furthermore, as far as the microcontroller is concerned, which is used for the evaluation of the signals as taught herein, it is practically irrelevant what type of evaluation program is implemented in the microprocessor. Thus, the required long term shelf-life of the fiber gyroscope is assured without a need for the long term stability of the transmission characteristics of the fiber coil. Nonsymmetric characteristics of the 3×3-coupler or of the photo-diodes can be taken into account by respective coefficients without any change in the calibration principle or operation as taught herein.

Although the invention has been described with reference to specific example embodiments, it will be appreciated that it is intended to cover all modifications and equivalents within the scope of the appended claims.

What is claimed is:

1. A method for self-correction of a fiber gyroscope with a 3×3-coupler including three photo-diodes, wherein a Sagnac-phase, a contrast, and an intensity of alight source are determined by evaluating the signal current values of said photo-diodes in a microprocessor connected through said 3×3-coupler to said fiber gyroscope, comprising the following steps:

(a) measuring three photo-currents of said photo-diodes ($D_1$, $D_2$, $D_3$) when said fiber gyroscope is at a rest position to produce corresponding first signal values ($P_{1R}$, $P_{2R}$, $P_{3R}$), (b) storing said first signal values ($P_{1R}$, $P_{2R}$, $P_{3R}$) in a memory of said microprocessor, (c) rotating said fiber gyroscope at any desired rotational speed, (d) measuring three new photo-currents as second signal values ($P_{1D}$, $P_{2D}$, $P_{3D}$) of said photo-diodes while said fiber gyroscope is rotating, (e) storing said second signal values ($P_{1d}$, $P_{2d}$, $P_{3D}$) in a memory of said microprocessor, and (f) determining, in a recurrent operation in said microprocessor, a new damping coefficient ($ds_{new}$) for a fiber coil of said fiber gyroscope by using a known old damping coefficient ($ds_{old}$) and said first and second stored signal values for self-calibrating said fiber gyroscope, whereby said recurrent operation is continued until a new damping coefficient converges to a constant value.

2. The method of claim 1, wherein said recurrent operation is performed by the following steps:

(a) determining said Sagnac-phase $\Phi$ by using the following equation:

$$\frac{P_{2D} - P_{3D}}{P_{2D} + P_{3D} - 2A/D \cdot ds_{old} \cdot P_{1D}} \cdot \cot c = \tan \Phi;$$

(b) determining a contrast factor k by using the following equation:

$$k = \frac{P_{2D}/P_{1D} \cdot D/ds_{old} - A}{B \cdot \cos(\Phi - c)};$$

(c) determining said new damping coefficient $ds_{new}$ by using the following equation:

$$d_{new} = P_{2R}/R_{1R} \cdot D/A + k \cdot B \cdot \cos c; \text{ and}$$

(d) repeating the foregoing recently ascertained ds value for a previously ascertained ds value, until the most recent ds value converges to a fixed value.

3. The method of claim 1, feeding nonpolarized light from said light source into input (2) of said 3×3-coupler, connecting said fiber coil to terminals (4 and 6) of said 3×3-coupler, connecting each of said terminals (1, 3, and 5) of said 3×3-coupler to one of said photodiodes, supplying photo-currents ($P_2$ and $P_3$) from photodiodes ($D_2$ and $D_3$) through signal summing circuit means to an A/D converter and then to said microprocessor for providing the signal sum and the signal difference as digital signals to said microprocessor, and supplying photo-current ($P_1$) from photodiode ($D_1$) through said A/D converter as a digital signal to said microprocessor.

* * * * *

UNITED STATES PATENT AND TRADEMARK OFFICE
CERTIFICATE OF CORRECTION

PATENT NO. : 5,146,292

DATED : September 8, 1992

INVENTOR(S) : Wolfhardt Buehler, Hans Poisel, Gert Trommer

It is certified that error appears in the above-identified patent and that said Letters Patent is hereby corrected as shown below:

Claim 1, column 4, line 46, replace "alight" by --a light--.

Claim 2, column 6, line 2, replace "$d_{new}=P_{2R}/R_{1R} \cdot D/A+k \cdot B \cdot \cos c;$"

by --$d_{new}=P_{2R}/P_{1R} \cdot D/A+k \cdot B \cdot \cos c;$--;

column 6, line 4, after "foregoing" insert:

--steps by replacing a more--.

Signed and Sealed this

Seventh Day of September, 1993

Attest:

BRUCE LEHMAN

*Attesting Officer*     *Commissioner of Patents and Trademarks*